Dec. 1, 1953    B. F. LINTON    2,660,982
ANIMAL HOLD-DOWN FOR CATTLE CHUTES
Filed July 26, 1952    2 Sheets-Sheet 1

INVENTOR
*Bert F. Linton*
BY
*Webster & Webster*
ATTYS

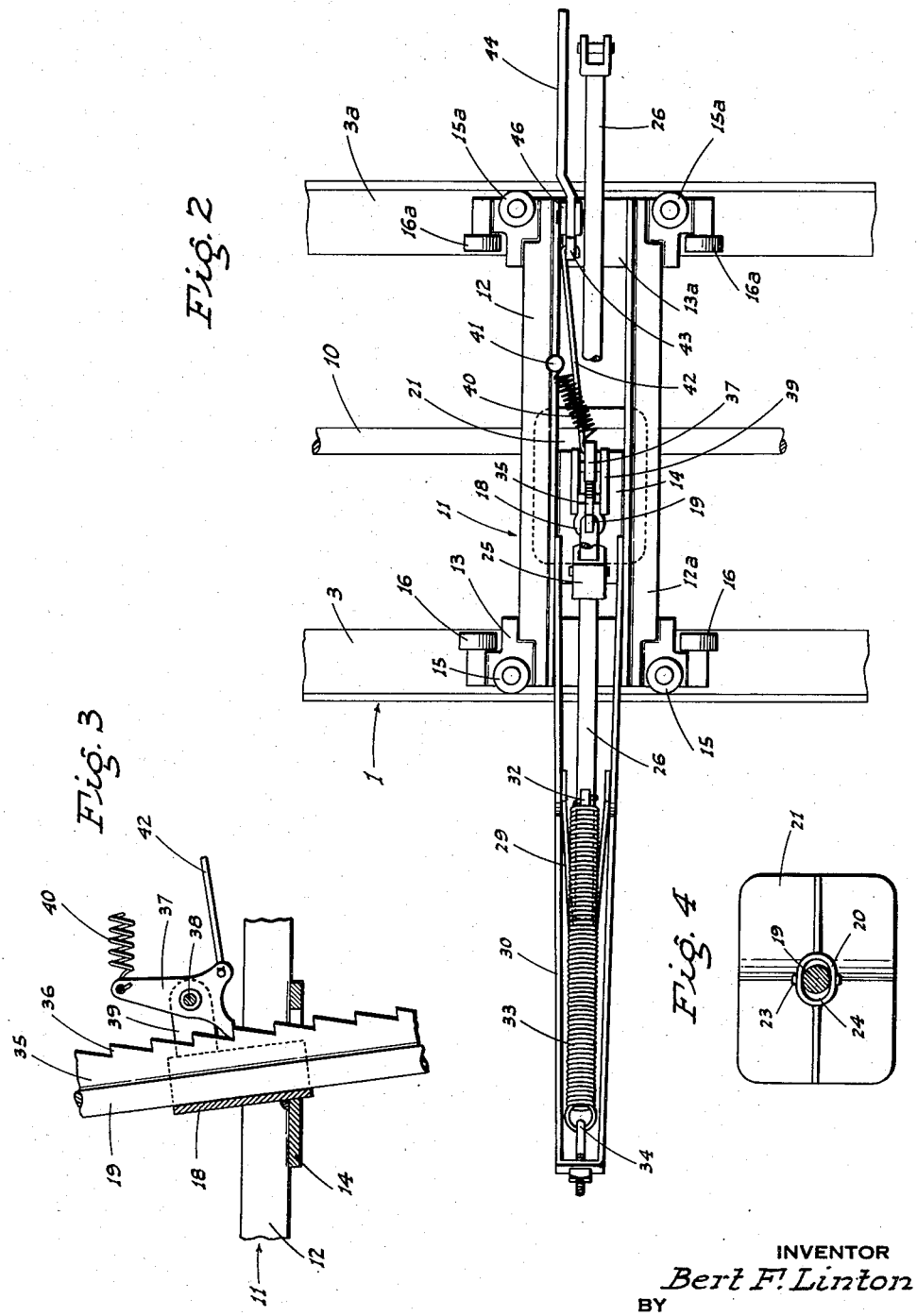

Patented Dec. 1, 1953

2,660,982

UNITED STATES PATENT OFFICE 2,660,982

ANIMAL HOLD-DOWN FOR CATTLE CHUTES

Bert F. Linton, Visalia, Calif.

Application July 26, 1952, Serial No. 301,137

5 Claims. (Cl. 119—98)

1

This invention relates to a cattle chute of the type known as a "squeeze," wherein an animal is held in position for sundry veterinary operations by a squeezing pressure applied to the sides of the animal.

In particular, this invention represents an improvement over, or an attachment to, the cattle chute shown in my patent, No. 2,510,703, dated June 6, 1950, and the principal object is to provide a hold-down device to engage the back of an animal over or adjacent the hips, so that the animal may be held in position without any excessive side pressure or squeeze being necessary.

Said device includes a back-engaging pad or saddle and a further object of the invention is to provide means for readily adjusting the pad both vertically and horizontally, so as to accommodate the pad to animals of different length and height.

Still another object of the invention is to provide an animal hold-down for cattle chutes which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 2 is an enlarged plan view of the device.

Fig. 3 is an enlarged fragmentary sectional elevation of the device showing the mounting and holding means for the supporting rod of the back-engaging pad.

Fig. 4 is a plan view of the pad, with its supporting rod in section.

Figure 1:
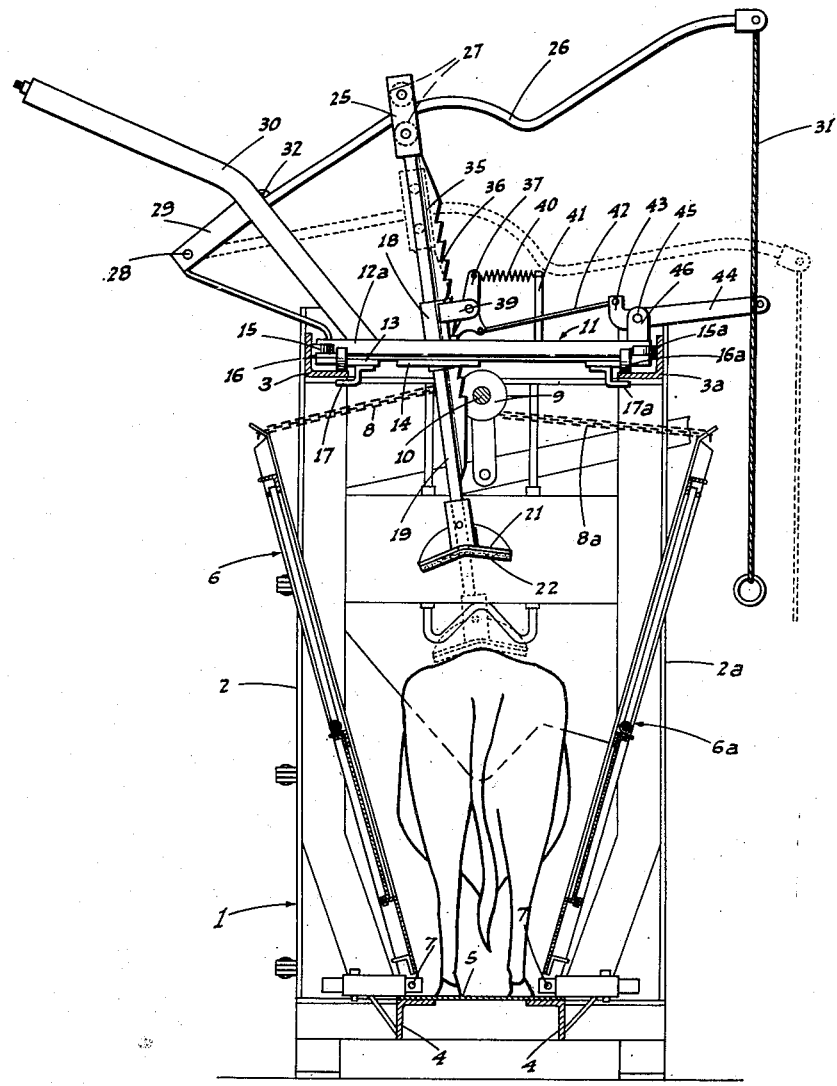
Fig. 1 is a transverse section of an animal chute, looking toward the exit end of the chute and showing the back hold-down device mounted thereon, the dotted position of the pad showing the same as engaging the back of an animal.

Referring now more particularly to the characters of reference on the drawings, the frame 1 of the cattle chute is of upstanding rectangular forms, as shown in the patent, and includes rear or exit end corner posts 2 and 2a, longitudinal top inwardly and upwardly facing angle beams 3 and 3a respectively adjacent the top of the posts, and other longitudinal beams 4 near the bottom of the posts and on which is mounted the animal supporting platform 5.

The chute includes the pressure sidewall units 6 and 6a pivoted at their lower end adjacent the platform 5, as at 7 and 7a, and connected at their upper end to chains 8 and 8a which are

2 wrapped from opposite directions about a drum 9 mounted on a hand-controlled rotary shaft 10 extending lengthwise of frame 1 centrally between beams 3 and 3a at a level below the same.

The hold-down device, which is the subject of this invention, comprises a transverse carriage 11 extending between and over the beams 3 and 3a and including longitudinally spaced beams 12 and 12a, plates 13 and 13a connecting said beams at their ends under the same and overhanging beams 3 and 3a, and another plate 14 supported by said beams 12 and 12a intermediate their ends.

Plate 13 supports rollers 15 and 16 on opposite sides of beams 12 and 12a to engage the sides and bottom, respectively, of beam 3, while plate 13a supports similarly disposed rollers 15a and 16a to engage beam 3a.

Possible upward displacement of the carriage is prevented by lugs 17 and 17a projecting under beams 3 and 3a from plates 13 and 13a, respectively, as shown in Fig. 1.

Supported by plate 14, and upstanding therefrom, is a sleeve 18 in which a rod 19 is slidable. The lower end of the rod enters a socket 20 upstanding from a rigid saddle 21 faced on its underside with cushion material 22. The rod is pivoted in the socket on an axis lengthwise of the chute, as at 23, and the socket is elongated transversely as shown at 24 so that the saddle can swivel somewhat to better accommodate itself to the back of an animal.

The rod is, of course, disposed to one side of the shaft 10 and since the latter is centrally disposed on the chute frame, said rod is laterally canted so that the saddle 21, on its lower end, is located substantially in a central vertical plane.

At its upper end, the rod is provided with an upstanding yoke 25 through which a lever 26 projects, said lever passing between friction-reducing rollers 27 in the yoke.

The lever extends transversely of the chute, and at one end is pivoted, at at 28, on a supporting arm unit 29 depending from a yoke 30 which extends transversely of the chute from one side of the carriage 11 and is secured to beams 12 and 12a thereof. The lever overhangs the opposite side of the chute and the adjacent end of the lever is connected to a depending pull cord 31. At a point 32 on the lever, between yoke 25 and pivot 28, a tension spring 33 is connected at one end to the lever, the opposite end of the spring being connected to the outer end of the yoke 30, as at 34, which end is well above said pivot, as clearly shown in Fig. 1. It will, therefore, be seen that said spring acts to hold the lever, and hence the rod 19 and saddle 21, raised.

Pulling down on the cord 31, of course, lowers the rod and saddle against the resistance of the spring, and in order to maintain the saddle in any desired lowered position the following arrangement is provided:

Extending down the side of rod 19, which is opposed to lever pivot 28, is a ratchet bar 35 whose teeth 36 face upwardly; the sleeve 18 being split for the passage and sliding of the bar. The teeth are releasably engaged by the lower end of a pawl 37 pivoted intermediate its ends, as at 38, on brackets 39 projecting from the sleeve 18.

A tension spring 40 is connected to the upper end of the pawl and to a post 41 upstanding from the beam 12. At its lower end, the pawl is connected to a pull rod 42 which extends to the upper arm 43 of a horizontal bell crank lever 44 pivoted, as at 45, on bracket ears 46 upstanding from carriage plate 13a to one side of lever 26.

The lever 44 overhangs the adjacent frame beam 3a so that it may be pulled down by the operator to release the pawl from the ratchet bar 35 and thus allow of upward movement of the saddle 21.

When an animal is to be treated in the chute, the sidewall units 6 and 6a are opened out and saddle 21 is allowed to lift to a position clear of the animal. The animal is then run into the chute, the entry gate thereof closed, and the sidewalls brought together against the sides of the animal to hold it steady.

Assuming that the use of the hold-down saddle 21 is desired, the carriage 11 is shifted one way or the other to dispose the saddle over the hips of the animal, and said saddle is then lowered by pulling down on the lever 26 until the desired pressure on the animal is obtained. There is then, of course, a tendency for the carriage 11 to lift, causing the lugs 17 and 17a to bear against the underside of beams 3 and 3a. The frictional pressure of the lugs against the beams clamps the carriage against movement, so that while the carriage may be easily slid back and forth, when not in use, it is held against such movement when the saddle is engaged with the animal, and possible longitudinal movement of the latter in the chute is frustrated without necessitating a heavy squeeze being exerted by the sidewall units.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In an animal retaining chute which includes longitudinal transversely spaced top frame beams below which an animal in the chute stands; a saddle adapted to engage the back of such animal, a carriage at a level adjacent that of and between the beams, means supporting the carriage from the beams for movement lengthwise thereof, means between the carriage and saddle supporting the latter for vertical movement, manual control means mounted on the carriage to lower the saddle into pressing engagement with the animal, and releasable means on the carriage holding the saddle in a lowered position.

2. In an animal retaining chute which includes longitudinal transversely spaced top frame beams below which an animal in the chute stands; a saddle adapted to engage the back of such animal, a carriage at a level adjacent that of and between the beams, means supporting the carriage from the beams for relatively frictionless movement lengthwise thereof, means between the carriage and saddle supporting the latter for vertical movement, manual control means mounted on the carriage to lower the saddle into pressing engagement with the animal whereby when the saddle resists further downward movement the carriage tends to lift, and means between the carriage and beams tending to then prevent lengthwise movement of the carriage.

3. A device as in claim 1, in which the carriage includes rollers riding on the beams, and lugs on the carriage extending under the beams in close but normal clearance relation thereto.

4. In an animal retaining chute which includes longitudinal transversely spaced top frame beams below which an animal in the chute stands; a saddle adapted to engage the back of such animal, a carriage at a level adjacent that of and between the beams, means supporting the carriage from the beams for movement lengthwise thereof, a rod upstanding from the saddle, an upstanding sleeve on the carriage and in which the rod is slidable, manual means between the carriage and rod to lower the rod, spring means on the carriage acting to lift the rod, a ratchet-tooth bar on the rod, and a releasable pawl on the carriage engaging the bar; said bar and pawl when engaged preventing upward movement of the bar and saddle.

5. A device as in claim 4, in which said manual means comprises a lever pivoted at one end on the carriage above said carriage and frame beams and extending transversely of the chute to a termination beyond one side thereof for manipulation from below, a yoke on the upper end of the rod through which the lever projects, and elements in the yoke slidably engaging the lever intermediate its ends.

BERT F. LINTON.

References Cited in the file of this patent

UNITED STATES PATENTS

| Number | Name | Date |
| --- | --- | --- |
| 1,194,046 | Luttrell | Aug. 8, 1916 |
| 2,576,654 | Thorson | Nov. 27, 1951 |

FOREIGN PATENTS

| Number | Country | Date |
| --- | --- | --- |
| 4,374 | Sweden | July 29, 1893 |
| 437,417 | Great Britain | Oct. 29, 1935 |